United States Patent [19]

Hiramoto et al.

[11] Patent Number: 4,832,301
[45] Date of Patent: May 23, 1989

[54] HANGER

[75] Inventors: Tsutomu Hiramoto, Hachioji; Satoshi Fukasawa; Takeshi Kubodera, both of Yamanashi; Kimimoto Hirose, Kofu; Sohji Shinozaki, Hachioji; Yoshitaka Yasufuku, Hino, all of Japan

[73] Assignee: Konishiroku Photo Industry Co., Ltd., Tokyo, Japan

[21] Appl. No.: 170,084

[22] Filed: Mar. 14, 1988

Related U.S. Application Data

[63] Continuation of Ser. No. 947,868, Dec. 30, 1986, abandoned.

[30] Foreign Application Priority Data

Dec. 31, 1985 [JP] Japan .......................... 60-203525[U]
Jul. 14, 1986 [JP] Japan .......................... 61-107640[U]

[51] Int. Cl.$^4$ .............................................. A47G 29/00
[52] U.S. Cl. ............................ 248/359 H; 248/205.3
[58] Field of Search ............ 248/467, 497, 498, 205.3, 248/215, 359, 360; 24/DIG. 11, 304

[56] References Cited

U.S. PATENT DOCUMENTS

| 10,739 | 6/1886 | Stetson | 24/DIG. 11 |
| 999,961 | 8/1911 | Colas | 248/498 |
| 2,635,604 | 4/1953 | Fredrickson | 248/359 |
| 3,016,224 | 1/1962 | Hall | 248/205.3 |
| 3,387,732 | 6/1968 | Jellies | 248/359 |
| 3,851,790 | 12/1974 | Kasper | 248/359 |
| 3,884,443 | 5/1975 | McMaster | 248/467 |

FOREIGN PATENT DOCUMENTS

| 2806391 | 8/1978 | Fed. Rep. of Germany | 248/359 |
| 1460738 | 12/1966 | France | 248/467 |
| 408315 | 9/1966 | Switzerland | 248/205.3 |
| 1175296 | 12/1969 | United Kingdom | 248/359 |
| 1309950 | 3/1973 | United Kingdom | 248/205.3 |

Primary Examiner—J. Franklin Foss
Assistant Examiner—Robert A. Olson
Attorney, Agent, or Firm—Finnegan, Henderson, Farabow, Garrett, & Dunner

[57] ABSTRACT

A hanger for hanging a product such as a video cassette for display is disclosed. The hanger is in a form of a flat plate, and comprises a bonding section capable of bonding to a product to be hanged, and a folding section having a hanging means such as a hole and is formed integral with the bonding section. The folding section is capable of turning upward by a predetermined angle with respect to its original state in which the bonding section and the folding section are substantially in the same plane. The hanger can be automatically bonded to the product and does not interfere with the automatic packaging of a number of products into a box due to its flat structure. The folding section is folded upward when the product to be displayed and is hanged by the hanging means on a displaying place.

5 Claims, 12 Drawing Sheets

FIG. IC
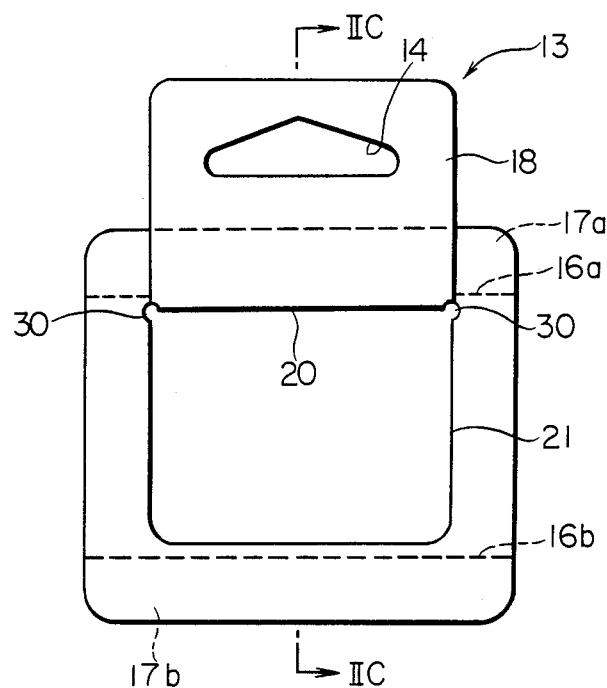
FIG. 2A
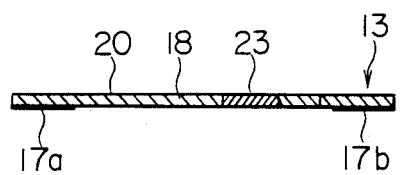
FIG. 2B
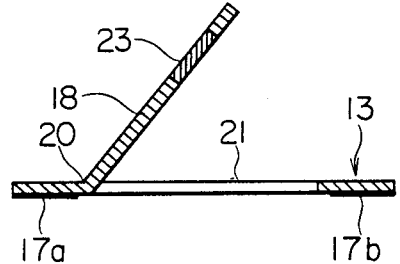
FIG. 2C
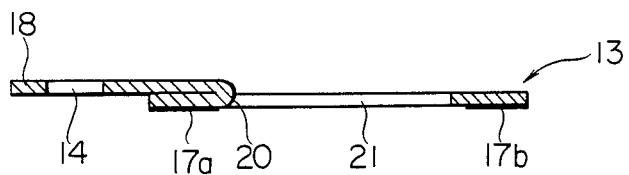

HANGER

This application is a continuation of application Ser. No. 947,868, filed Dec. 30, 1986, abandoned.

FIELD OF THE INVENTION

The present invention relates to a hanger, and more particularly, to such type of hanger that is suitable for hanging a product such as a video cassette in a shopwindow for display.

BACKGROUND OF THE INVENTION

Suppose if a number of products such as video cassettes could be displayed for sales by hanging them in a shopwindow, then it would be possible to increase not only the number of products to be displayed but also the effect of appealing to customers' interest.

As one of such display means, there is shown in FIG. 23 an idea that a plastic flat hanger 3 provided with a through hole 4 is applied to the upper part of a casing 2 accommodating a video cassette 1 therein and a hanging rod 5 is passed through the through hole 4 whereby a number of video cassettes can be hanged down for display. The hanger 3 includes a bonding section 7 which consists of a double-coated adhesive tape extending up to a broken line 6 and which is applied to each cassette, and a hanging section 8 including the through hole 4. Both of the sections 7 and 8 may be made integral with each other by punching a single flat plate. In display, the product is so hung that it may be viewed from the direction of the arrow 9.

However, in case a number of video cassettes are delivered to a distributor while they are received within a box 10 as shown in FIG. 24, difficulties arise that since the hanging section 8 of the hanger 3 projects outward, the products cannot be received within the box with ease and the projecting hanging section 8 of each hanger 3 tends to deform.

To prevent the above difficulties, there is an idea that the hanger 3 is not applied to each video cassette when the latter is received within the box 10 but is applied after it is taken out from the box 10 by the distributor. However, it is quite troublesome to apply the hanger 3 to the product by hand and also the applied position of one hanger is liable to be misaligned with that of another.

SUMMARY OF THE INVENTION

The object of the present invention is to provide a hanger which can be automatically applied to a product and which can be neatly and automatically packed into a box.

The object of the invention is accomplished by a hanger in a form of a flat plate comprising a bonding section capable of bonding to a product to be hanged, and a folding section formed integral with the bonding section and having a hanging means, the folding section is capable of turning upward by a predetermined angle with respect to its original state in which the bonding section and the folding section are substantially in the same plane.

The hanger is bonded onto a product and the folding section is folded upward when the product to be displayed and is engaged by the opening portion on a displaying place. The opening portion may be various forms such as a through hole or a recess.

BRIEF DESCRIPTION OF THE DRAWINGS

The drawings show embodiments of the present invention wherein:

FIGS. 1A, 1B and 1C are plane views, respectively, which illustrate a hanger of the present invention along with the operation of a folding section forming part of the hanger;

FIGS. 2A, 2B and 2C are sectional views, respectively, of the hanger of the present invention especially when taken along a IIA—IIA line of FIG. 1A, a IIB—IIB line of FIG. 1B and IIC—IIC lines of FIG. 1C;

DETAILED DESCRIPTION OF THE INVENTION

Preferred embodiments of the present invention will now be described in detail with reference to the accompanying drawings.

FIGS. 1 and 2 show a hanger 13 according to a first embodiment of the present invention.

Figure 1A:
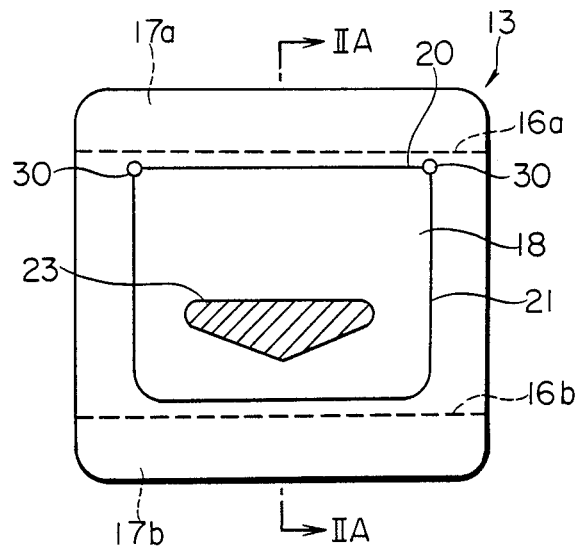
Figure 1B:
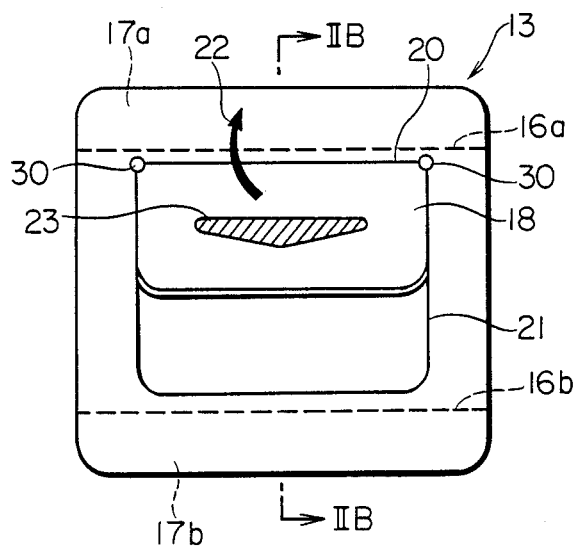

The hanger 13 shown in FIGS. 1A and 1B is in the form of a flat plate substantially in the same plane in its entireties and the upper and the lower part of the hanger are provided with bonding sections 17a and 17b extending to positions designated by broken lines 16a and 16b. Each of the sections 17a and 17b consists of a double-coated adhesive tape and forms itself a bonding section with respect to a product to be hung. However, these bonding sections do not necessarily consist of adhesive tapes but mere use of a bonding agent can also serve to form these sections. Further, a folding section 18 is integrally formed between the bonding sections 17a and 17b so that it can be turned upward about a folding line 20. The folding section 18 is separable from the body of the hanger 13 along a U-shaped cut-off line 21 extending along both sides and the lower side of the hanger so that the folding section 18 can be turned upward about the folding line 20 from the direction of the arrow 22 as shown in FIG. 1B and FIG. 2B. The folding section 18 can be formed in such a manner that the cut-off line 21 is punched simultaneously with the punching of the whole of the hanger 13 from a polyethylenetelephthalate plastic sheet and can be made integral with the bonding sections 17a and 17b through the cut-off line 20 subject to pushing, provided that the step of forming the cut-off line 20 or the folding line 21 can be changed. Further, the folding section 18 has a punched piece 23 in its original state (FIG. 1A) but when it has been completely turned upward as shown in FIG. 1C and FIG. 2C, the punched piece 23 is removed for the formation of a hang position in the form of a through hole 14 through which a rod to be described later is inserted. The punched piece 23 may of course be removed in the state shown in FIG. 1A.

The hanger 13 may be made of various materials, for example a plastic such as polyethylene or polyethylenetelephthalate, metal foil or paper.

The manner of using the hanger 13 of the above structure will now be described by referring to FIGS. 3 through 6.

In the manufacturing line of video cassettes, a video tape is charged in a cassette, the cassette is mounted in a casing 2 as already described and the entire casing 2 is covered with a transparent packing film. Further, a number of charged cassette casings are packed in a box. Thus the above series of steps including packaging is performed automatically in the manufacturing line.

Figure 3:
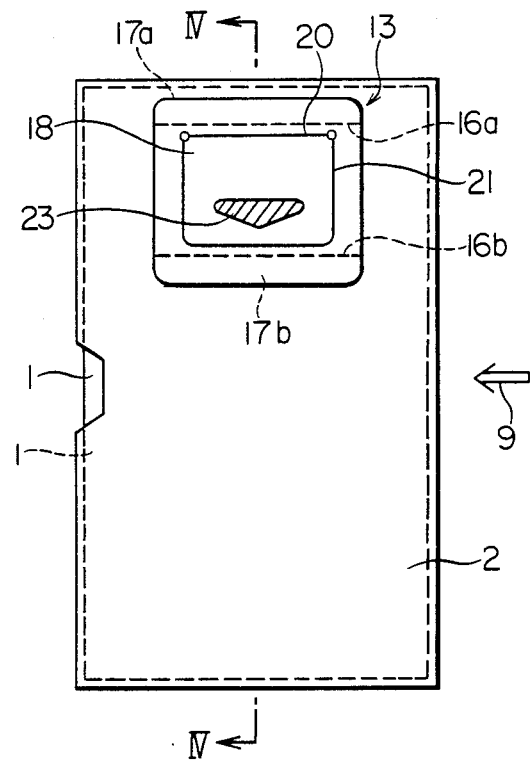
FIG. 3 is a plane view of the hanger in a state in which the hanger is applied to a cassette casing.

In use, the hanger 13 is automatically bonded or applied to the predetermined upper portion of the casing 2 (attached with the packing film) as shown in FIG. 3 and then the casing 2 is transferred to the packing line. As the hanger 13 is attached in its entireties, many cassette casings can be easily and closely packed so that they are favorably and automatically packed in the box in the same manner as in the case when the hanger 13 is not applied to each of the casings 2.

Figure 5:
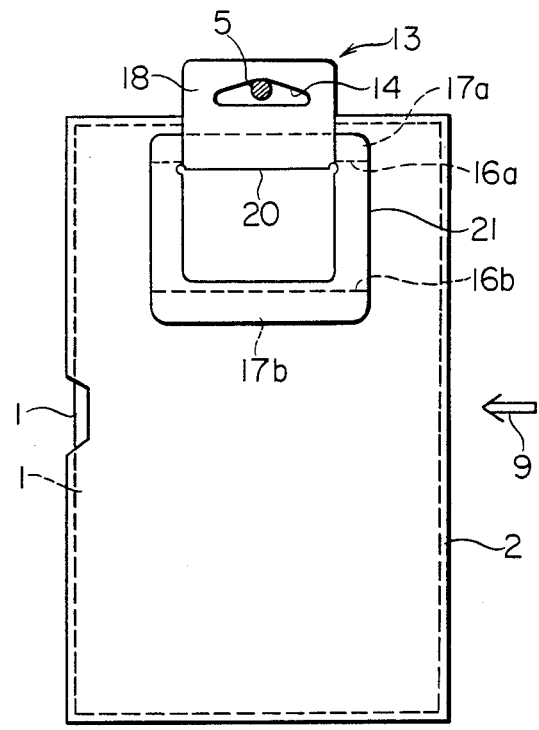
FIG. 5 is a side view illustrating a state in which one of the cassette casings is hung by the hanger.
Figure 6:
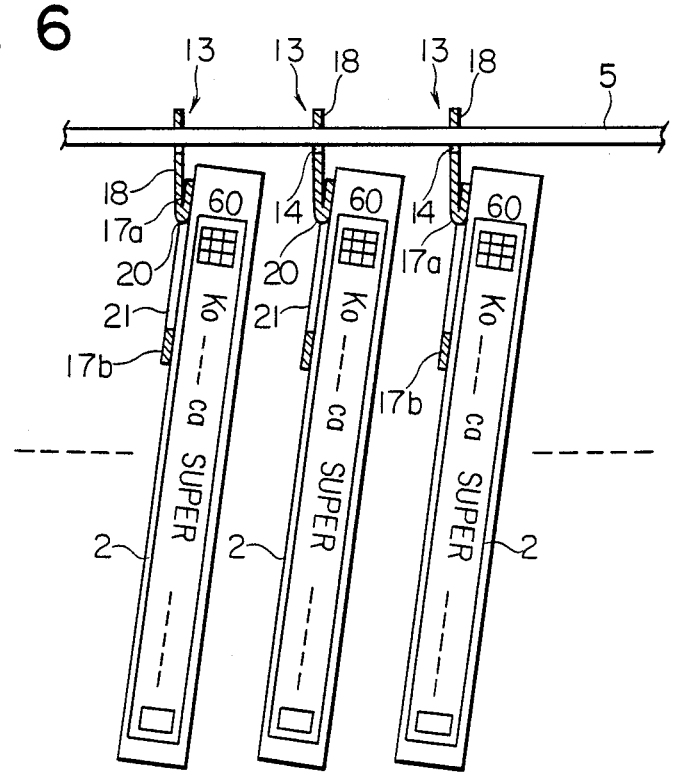
FIG. 6 is a front view taken from the direction of the arrow 9 of FIG. 5.

The packed cassette casings 2 are then delivered to distributors who in turn take them out from the box 10 and as shown in FIGS. 5 and 6, the folding seciton 18 of the hanger 13 is turned upward and then bent along the folding line 20. At the same time, the punched piece 23 is removed and the hanging rod 5 is passed through the resultant through hole 14 after removing the punched piece 23. Thus, by the engagement of the rod 5 with the through hole 14, it is possible to hang a number of cassettes in a shopwindow for display.

As will be clear from the foregoing, the video cassette hanger according to the instant embodiment is flat in its original state so that when the cassette casing 2 attached with the hanger is packed in a box, it does not interfere with the packing operation and the cassette casing can be automaticaly packed in the manufacturing line after the hanger 13 is automatically applied thereto. Accordingly, the hanger is very convenient because the distributor can display the video cassettes only by turning up the folding section 18 of the hanger after taking them out from the box, and further, since the hanger is automatically applied to each of the cassette casings, there arises no irregularity among the hanger applied positions and the video cassettes can be displayed always in their desired postures.

Figure 4:
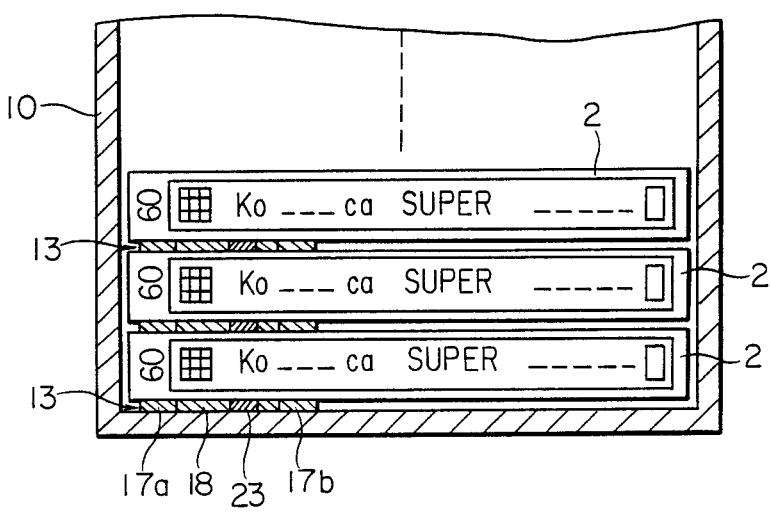
FIG. 4 is a schematic view, with the inclusion of a vertical sectional view taken along a IV—IV line of FIG. 3 when viewed from the direction of the arrow 9, showing a state in which a plurality of cassette casings are packed into a box.

Further, the hanger 13 itself is punched from a plastic plate so that the folding section 18 can be elastically turned upward and although the section tends to get a habit of being folded, it can still return to its original position elastically. In this case, if the section 18 is released from pressure applied thereon, it tends to deform in the turning direction but it can be held in its original positon by mere application of pressure thereon again and therefore, the products can be laid one above another compactly as shown in FIG. 4 when they are re-packed into the box after display.

In addition, at both ends of the cut-off line 21, that is, the positions where the line 21 intersects the folding line 20, there are provided small circular holes 30, respectively, so that when the folding section 18 is turned upward along the folding line 20, the portions around both ends of the line 21 do not tear up because these holes 30 have the action of scattering the stress applied on these portions.

Figure 7:
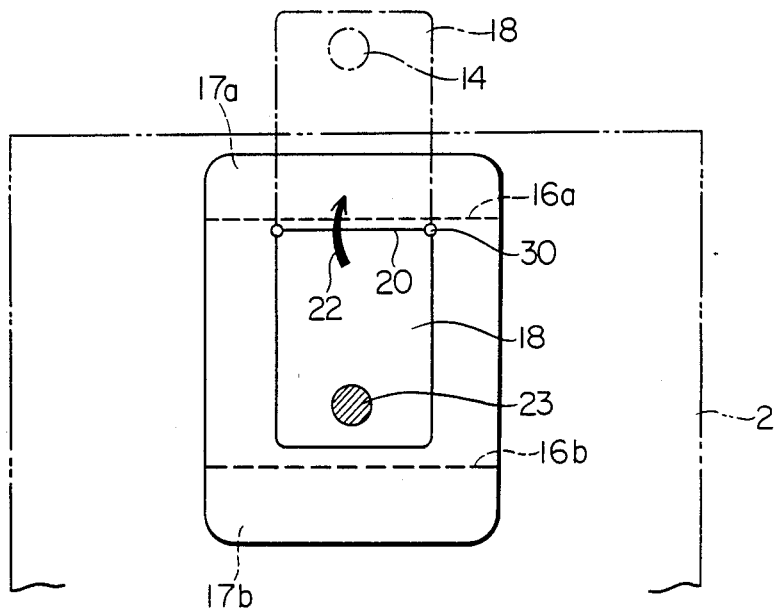
FIGS. 7 and 8 are plane views, respectively, of another embodiment of the hanger of the present invention.
Figure 8:
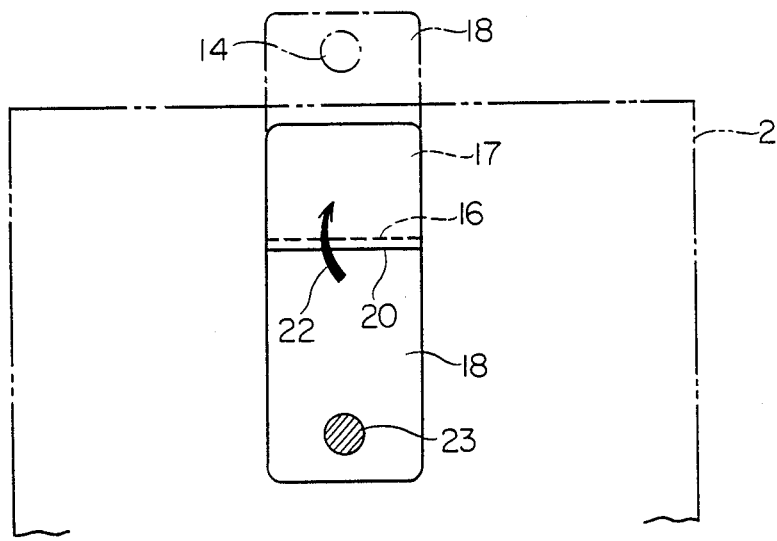

FIGS. 7 and 8 show other embodiments of the present invention.

The hangers according to the instant embodiments are different from those shown in FIGS. 1 through 6 only in respect of their shapes. Each of the hangers is applied to the video cassette casing 2 shown by a two-dot chain line and the casing 2 is displayed after the folding section 18 of the hanger is turned upward. Unlike the hanger of FIG. 7, the hanger of FIG. 8 has only a single bonding section 17 but for all that, it can sufficiently answer the purpose.

FIGS. 9 through 14 show various variations of the folding section 18 of the hanger according to the first embodiment.

Figure 9:
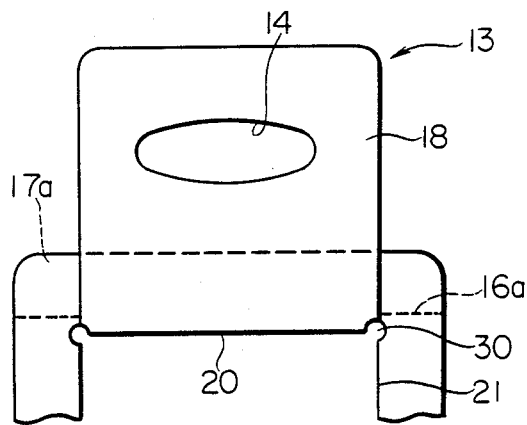
FIGS. 9, 10, 11, 12, 13 and 14 are plane views, respectively, of portions of further embodiments of the hanger of the present invention especially in states in which they are turned up.
Figure 10:
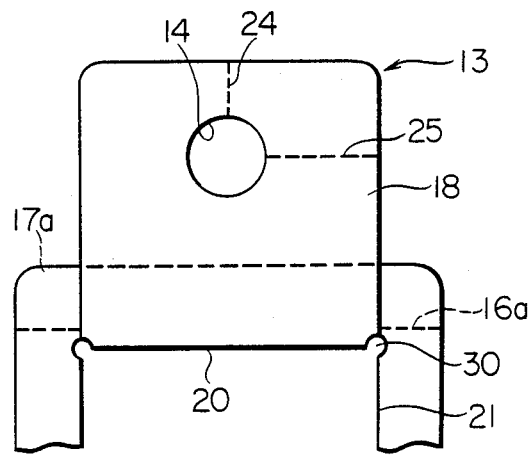

That is, the hanger of FIG. 9 has a through hole 14 substantially elliptical and the hanger of FIG. 10 has a substantially circular through hole 14 from which a perforated line 24 or 25 extends to the outer edge of the folding section 18. Therefore, when the hung is hanged down by the insertion of the rod 5 as shown in FIGS. 5 and 6, if it is required to take out a desired cassette, the rod 5 will be able to be removed by tearing off the folding section along the line 24 or 25 so that the cassette is taken out easily and quickly without giving rise to an adverse effect on the display conditions of the remaining cassettes. The hanger may have only a single perforated line or a plurality of such lines or cut-off line instead of the perforated line.

Figure 11:
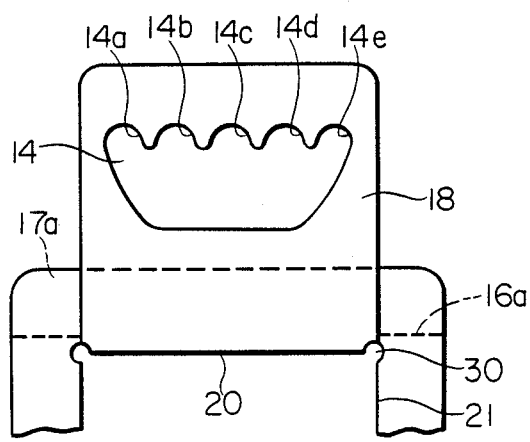
Figure 12:
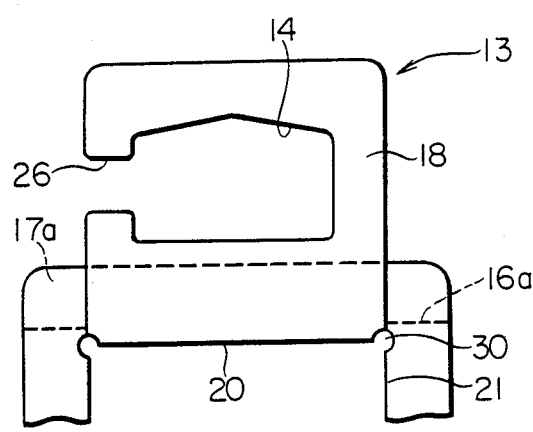
Figure 13:
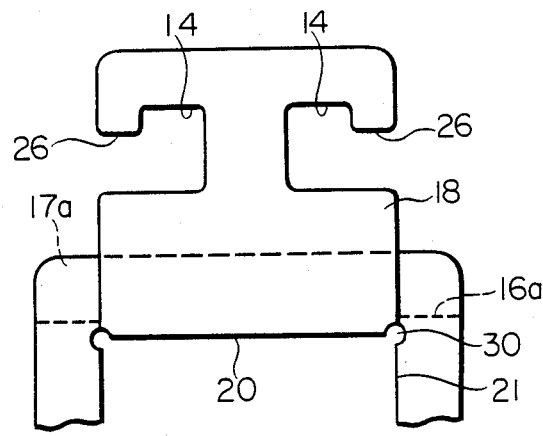

FIG. 11 shows a hanger having a through hole 14 of specific configuration with the upper portion of the through hole forming a series of concave section 14a, 14b, 14c, 14d and 14e in the lateral derection for receiving the rod 5 therein. The number of the concave sections is not always limited to five if at least more than two. Thus, with such structure of the through hole 14, the rod 5 may be inserted into different concave sections per cassette casing so that a plurality of cassettes can be shifted from one another forwardly and rearwardly when they are displayed in the manner shown in FIG. 6. Alternatively, a plurality of rods 5 may be inserted into the through hole 14 through desired concave sections, respectively. As a result, the display and taking out of the cassettes are made with ease. The hanger of FIG. 12 features that it has a recess 14 as the hanging means instead of the penetrating through hole 14 in the above embodiments and also a hooklike folding section 18. With the formation of such recess and folding section, it is possible to insert and remove the rod 5 into, and from, a side opening 26 forwardly and rearwardly when viewed in FIG. 6. FIG. 13 shows a hanger having a folding section 18 including two symmetrical hooklike portions which allow the rod 5 to be inserted therethrough from either the right or left side. This structure is convenient because When the hanger is applied to a product in the manner shown in FIGS. 3 through 6, the rod 5 can be inserted into the folding section always from the same direction even when the hanger is applied to any surface of the product. (On the contrary, in the case of the hooklike structure of the folding section 18 of FIG. 12, the direction of insertion of the rod 5 is reversed when the hanger is applied to the opposite side of the product.)

Figure 14:
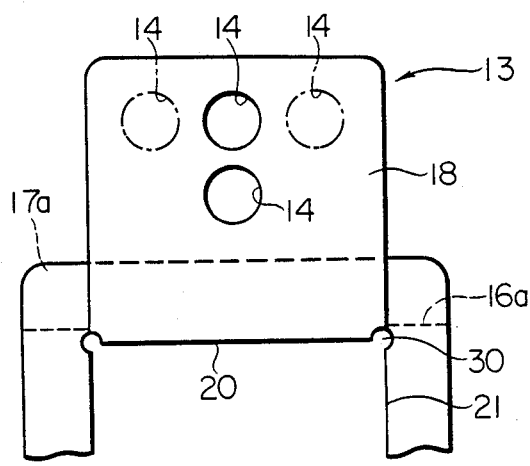

FIG. 14 shows a still further type of folding section 18 having a plurality of through holes 14. That is, if two through holes 14 are formed up and down, the product can be hanged down at positions of different heights. Further, a plurality of through holes, for example, three including those defined by dashed lines, are formed in the lateral direction, it is possible to display products in the postures described with reference to FIG. 11.

Figure 15:
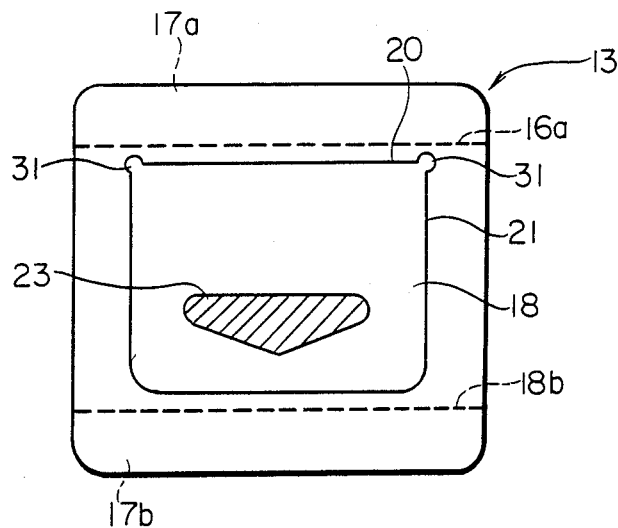
FIGS. 15, 16 and 17 are plane views, respectively, of still further embodiments of the hanger of the present invention.
Figure 16:
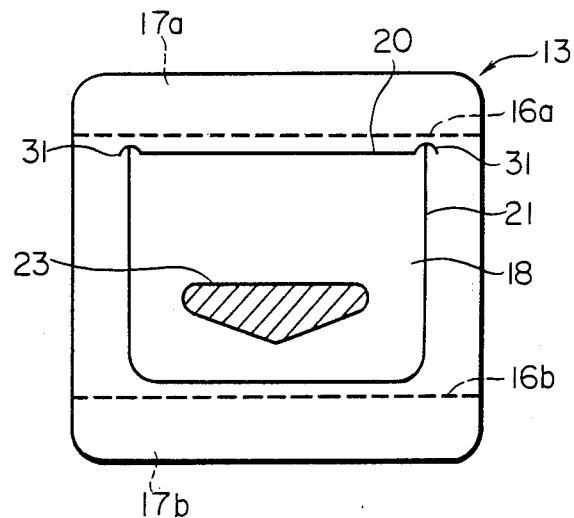

FIGS. 15 and 16 show variations of the small holes 30 between the folding line and the cut-off line 21 as described with reference to FIGS. 1A and 1B. That is, both ends of the folding line 20 and those of the cut-off line 21 are connected through semi-circular notches 31. This structure also prevents the folding section 18 from tearing off.

Figure 17:
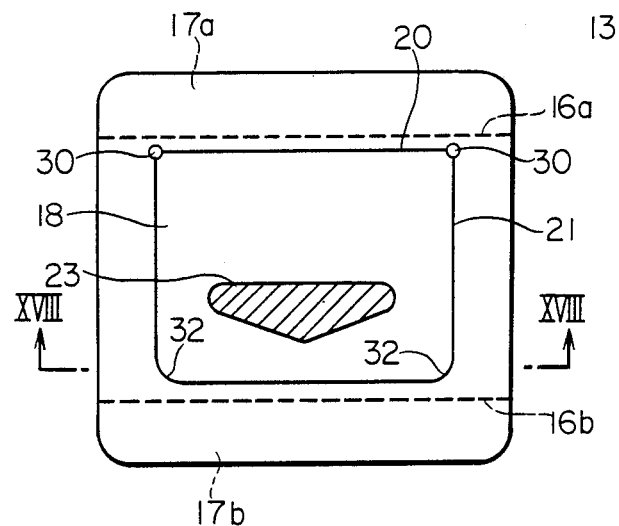
Figure 18:
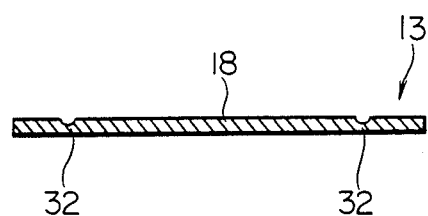
FIG. 18 is a sectional view taken along a XVIII—XVIII line of FIG. 17.

FIGS. 17 and 18 show a hanger whose folding section 18 is partially integral with the surrounding peripheral section of the hanger such that parts (for example, two parts) or the hanger along the cut-off line 21 defining the section 18 are made thin to provide small thickness sections 32 in symmetrical relationship whereby the folding section 18 is always kept in its original state without displacing inside or outside when the hanger is not in use, thereby enabling the hanger to be handled easily. As the small thickness sections 32 can be easily teared off in use, it is possible to separate the folding section 18 from the remaining portion of the hanger along the cut-off line 21 and to turn it upward in the same manner as above-mentioned.

In any of the above embodiments, the hanger 13 comprises a single plate but it may be formed of a composite plate including more than two layers shown in FIG. 19. As shown, hanger 13 is formed of double-layer plate comprising a first layer 28 and a second layer 29 integrally bonded to the former with a suitable bond. The second layer 29 may be of the same nature as the hangers shown in FIGS. 1 and 2. It is desirable that the layer 29 be firmly bonded to the layer 28 at the four sides of the former by using a bond 17.

The hanger 13 of such composite structure is advantageous in that in case the second (upper) layer 29 is made of a material such as paper having a low degree of strength for the sake of easy printing, the first layer as a substrate may be made of a plastic material to strengthen the entire hanger.

Figure 19A:
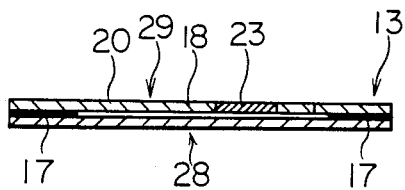
FIGS. 19A, 19B and 19C are sectional views, respectively, illustrating folding operations of still further embodiments of the hanger of the present invetion.
Figure 19B:
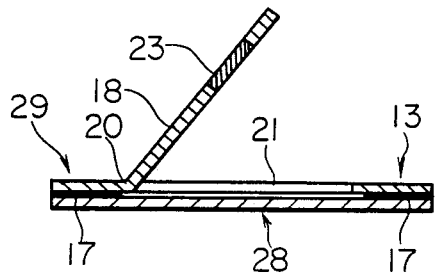
Figure 19C:
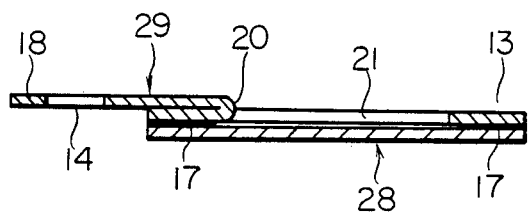

On the contrary, the first layer 28 may be made of a printable material such as paper and characters or pictures may be printed thereon so that when the folding section 18 of the hanger 13 is turned upward as shown in FIG. 19C, the prints on the first layer 28 is exposed to the eyes of customers thereby improving the commercial value of the hanger. In this case, the upper layer 29 may of course be molded from a plastic material.

Further, the above-mentioned lamination layer may form part of, or extend throughout, the hanger.

Figure 20:
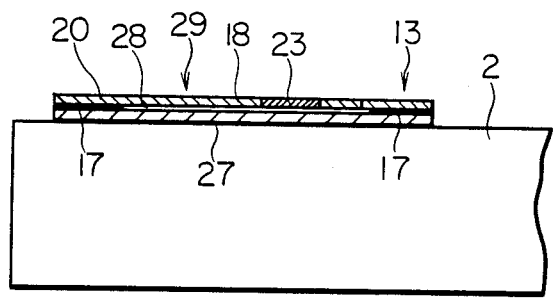
FIG. 20 is a sectional view of the hanger of the present invention especially when the hanger is applied to a product.

FIG. 19A, 19B and 19C correspond to FIGS. 2A, 2B and 2C. When the hanger is actually applied to a product 2, the bond 27 may be coated on the entire surface of the lower layer 28 and fixed to the product as shown in FIG. 20 and in that case, the bonding strength of the hanger is greatly improved.

It should be noted although the present invention has been described with reference to the above embodiments, other various alterations or modifications are made possible on the basis of the technical idea of the present invention.

Figure 21:
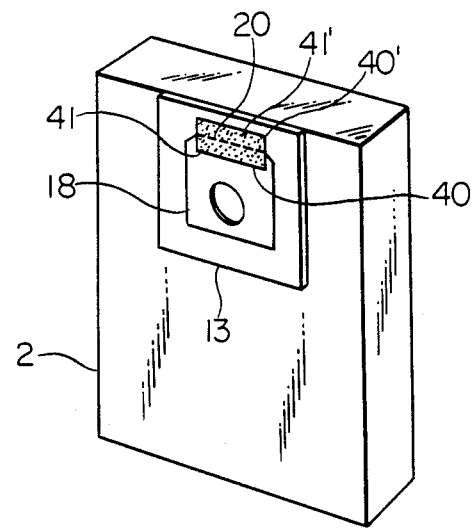
FIG. 21 is a perspective view of the hanger of the present invention showing a state in which a hanger having stop means at opposing surfaces of its folding section and the remaining part of the hanger is applied to a product.
Figure 22:
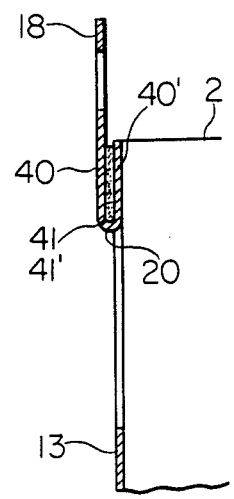
FIG. 22 is a side view of the folding section of the hanger shown in FIG. 21 illustrating a state in which the holding section is attached to the attachment means after the former is truned upward.
Figure 23:
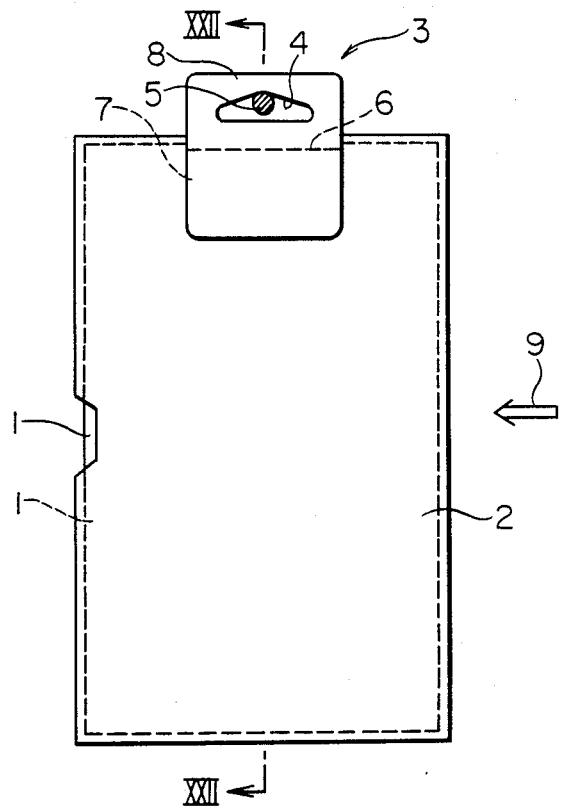
FIG. 23 is a side view of a cassette casing when the cassette casing is hung down by the hanger of an example of the prior art.
Figure 24:
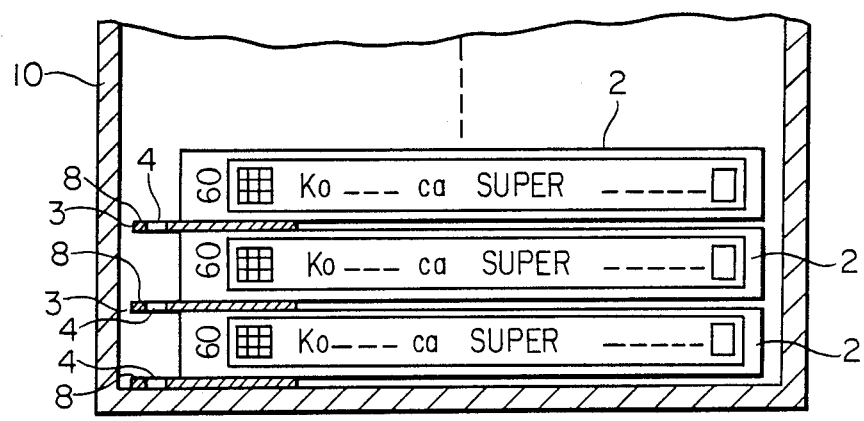
FIG. 24 is a schematic view, with the inclusion of a sectional view taken along the XXII—XXII line of FIG. 23, illustrating a state in which a plurality of cassette casings are packed into a box, the view being taken from the direction of the arrow 9.

For example, the shape of the hanger of the present invention may be subject to various changes and the through hole 14 and the tear-off line extending therefrom may take various shapes. Further, the folding line 20 may be formed with a series of perforations or may be replaced with a hinge structure by molding and the cut-off line 21 may be a series of perforations. In addition, as shown in FIG. 21, bonding means 41 (or 41 and 41') may be provided at either or both of the folded surface portion 40' of the hanger coming to lie opposite to the former when the folding section 18 is turned upward so that the surface portion 40 is fixed to the surface portion 41'. Thus, by so doing, the folding 18 in FIG. 22 is integrally fixed to the product 2 to which the hanger 13 is applied. Consequently, a plurality of like products can be hanged at a uniform angle and the strength of the folding section is improved.

In the illustrated example, the above-mentioned bonding means 41 and 41' are formed of bond layers applied to the surface portions 40 and 40'. The bond for forming these layers is desirably of such quality that when it is coated to the opposing surface portions 40 and 40' in a fluidized state and then dried, the coated surfaces adhere to each other only when they are pressed against each other. Of course, it is possible to use a bond capable of keeping a permanent adhesion but in this case, it is necessary to cover it with release paper for the prevention of its adhesion to other portions or things. Sometimes, a double-coated adhesive tape may also be used.

Further, besides the bonding means consisting of the above-described bond layers, male and female fasteners or a tongue piece and a notch or a projection and a hole mating each other may be provided at the above-mentioned opposing surfaces. These arrangements may be determined optionally depending on the shape and weight of the product to be hung.

All the hangers of the above-described embodiments are of the type having a through hole as a hang means in the folding section (with the inclusion of the recessed type) but there are other various means. For example, the folding section 18 may be formed of a ferromagnet which is attracted to a stop means (like a magnet) other than the above-mentioned rod means. Alternatively, if a bond coated on the folding section 18 so as to hold the section fixed to the upper part of the hanger when the section is turned upward. Then it will be possible to hang a product by the mere force of attraction or adhesion without using a rod to pass through the folding section 18.

Further, the hanger of the present invention can be used to hang down various kinds of products other than video cassettes. For example, it is available for toys and other articles of daily use.

As described above, the hanger of the present invention has various advantages that since it is formed of the bonding section and the folding section which when in their original states, are substantially in the same plane, it can be automatically applied to a number of products in its original state without interfering with the automatic packaging of the products into a box. Therefore, the distributor can readily display the products by merely turning the folding section of the hanger upward as soon as the products are taken out from the box. Thus the hanger is very convenient and as it can be automatically applied to each product, no irregularities of bonding position take place among the products and the products can be displayed always in their desired postures.

What is claimed is:

1. A hanger comprising:
   a flat plate having a top edge and a bonding section capable of receiving an adhesive layer;
   a folding section integrally formed with said bonding section, said folding section and said bonding section being joined at a fold line;
   said folding section having hanging means associated with said folding section distal said fold line, said folding section being rotatable out of the plane of said bonding section around said fold line between a first position wherein said folding section and said bonding section are substantially coplanar and a second position diametrically opposed to said first position, and said hanging means being positioned above said top edge when said folding section is in its second position; and
   an adhesive strip disposed along said fold line capable of bonding said folding section to said bonding section when said folding section is in the second position.

2. A hanger as claimed in claim 1, wherein said hanging means includes a hole formed in said folding section.

3. A hanger comprising:
   a flat plate having a top edge and a bonding section capable of receiving an adhesive layer;
   a folding section integrally formed with said bonding section, said folding section and said bonding section being joined at a fold line;
   said folding section having hanging means associated with said folding section distal said fold line, said folding section being rotatable out of the plane of said bonding section around said fold line between a first position wherein said folding section and said bonding section are substantially coplanar and a second position diametrically opposed to said first position, and said hanging means being positioned above said top edge when said folding section is in its second position;
   a substrate having an upper surface and a lower surface, said bonding section of said flat plate being bonded to said upper surface, said lower surface of said substrate being capable of receiving an adhesive layer, and said upper surface of said substrate being capable of receiving printing; and
   an adhesive strip disposed along said fold line and being capable of bonding said folding section to said bonding section when said folding section is in the second position.

4. A hanger for suspending a product, the product having a top edge and a side, comprising:
   a flat plate having a top edge and including a bonding section formed integrally with a folding section, said bonding section and said folding section each having a bottom surface and a tip surface opposite the bottom surface;
   said flat plate having a defined fold line between the folding section and the bonding section, said fold line being disposed between said folding section and said top edge of said flat plate;
   said bottom surface of said bonding section being bondable to the side of the product; and
   said folding section having hanging means associated with said folding section opposite said fold line, said folding section being rotated out of the plane of said bonding section around said fold line from a first position wherein said top surface of said folding section and said top surface of said bonding section are substantially coplanar and to a second position, diametrically opposed to said first position, to position said hanging means above the top edge of the product.

5. A hanger comprising:
   a product having a top side, a bottom side, a longitudinal surface joining the top and bottom sides, and a center of gravity between the top side and the bottom side;
   a flat plate having a top edge and including a bonding section formed integrally with a folding section, said bonding section and said folding section each having a bottom surface and a top surface, said folding section and said bonding section being joined at a fold line, and said fold line being defined between said folding section and said top edge of said flat plate;
   said bottom surface of said bonding section being bonded to the longitudinal surface of the product to place the fold line between the center of gravity of the product and the top edge of the product and to place the top edge of the flat plate between the fold line and the top edge of the product; and
   hanging means associated with said folding section, said folding section being rotatable out of the plane of said bonding section around said fold line between a first position wherein said top surface of said folding section and said tip surface of said bonding section are substantially co-planar and a second position, diametrically opposed to said first position wherein said top surface of said bonding section opposes said top surface of said folding section, the hanging means being positioned above the top edge of the product at times when said folding section is in said second position.

* * * * *

UNITED STATES PATENT AND TRADEMARK OFFICE
CERTIFICATE OF CORRECTION

PATENT NO. : 4,832,301
DATED : May 23, 1989
INVENTOR(S) : Tsutomu Hiramoto et al.

It is certified that error appears in the above-identified patent and that said Letters Patent is hereby corrected as shown below:

Claim 4, column 8, line 16, change "tip" to --top--.

Claim 5, column 8, line 57, change "tip" to --top--.

Signed and Sealed this

Twelfth Day of June, 1990

*Attest:*

HARRY F. MANBECK, JR.

*Attesting Officer*     *Commissioner of Patents and Trademarks*